(No Model.)
H. A. BEHRNS.
GUIDE MARKER FOR CORN PLANTERS.
No. 477,983. Patented June 28, 1892.
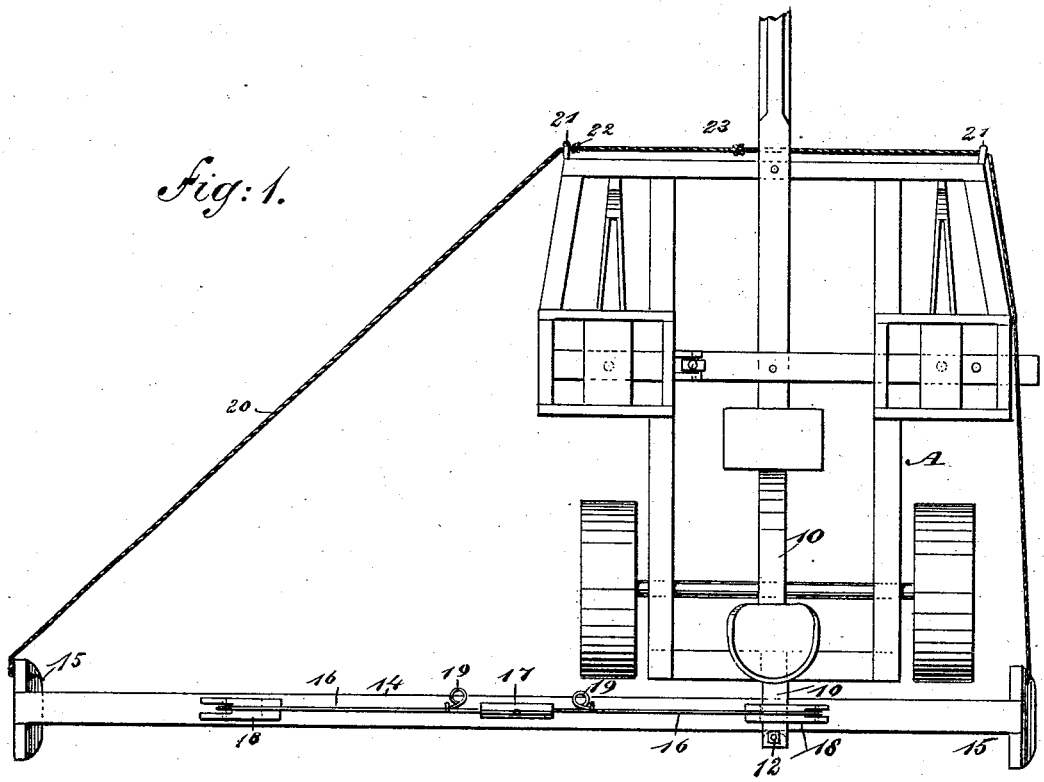
Fig: 1.
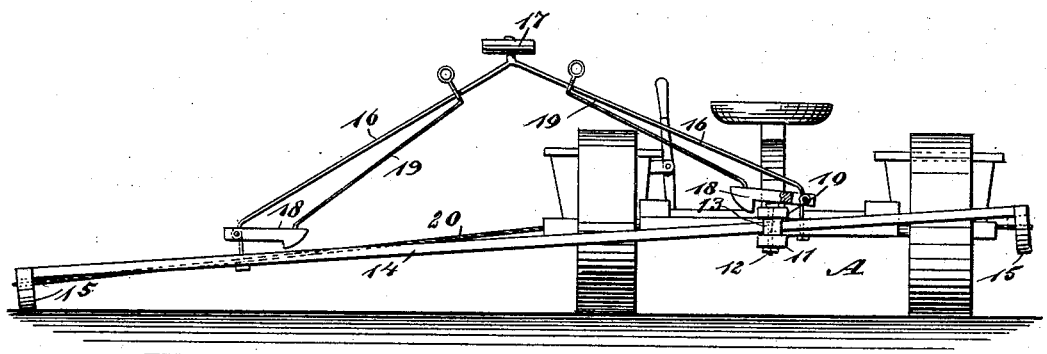
Fig: 2.
WITNESSES:
Chas. Nida.
C. Sedgwick
INVENTOR:
H. A. Behrns
BY Munn & Co
ATTORNEYS.

UNITED STATES PATENT OFFICE.

HERRMAN A. BEHRNS, OF ORCHARD, IOWA.

GUIDE-MARKER FOR CORN-PLANTERS.

SPECIFICATION forming part of Letters Patent No. 477,983, dated June 28, 1892.

Application filed March 3, 1892. Serial No. 423,601. (No model.)

*To all whom it may concern:*

Be it known that I, HERRMAN A. BEHRNS, of Orchard, in the county of Mitchell and State of Iowa, have invented a new and Improved Guide-Marker for Corn-Planters, of which the following is a full, clear, and exact description.

My invention relates to a guide-marker for corn-planters, and has for its object to provide a device exceedingly simple, durable, and economic in its character, and capable of being applied to any corn-planter and of being conveniently and expeditiously shifted, so as to mark either at the right or at the left of the implement, and whereby the marker may be further shifted so that it will not engage with the ground at either side of the implement, thus permitting the latter to be readily turned when desired.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in both the views.

Figure 1 is a plan view of a planter having the marker applied thereto, and Fig. 2 is a rear elevation of the implement and the marker.

The tongue 10 of the corn-planter A is projected rearward beyond the rear end of the implement, as shown in Fig. 1, and beneath the rear end of the tongue a parallel block or beam 11 is secured to the marker, while at the extremity of the block and the tongue a bolt 12 is located, carrying between the block and the tongue a friction-roller 13 or the equivalent thereof. If in practice it is found desirable, instead of the tongue 10 being carried beyond the rear end of the implement an extension-beam may be substituted therefor.

In front of the friction-roller 13 and between the block or beam 11 and the tongue 10 the body of the marker is located, which body consists of a beam 14, of suitable length. This beam has free movement between the block 11 and the tongue 10 transversely of the implement, and the marking blocks or shoes 15, which may be of any suitable or approved construction, are secured to the ends of the body or beam 14.

A rigid bail 16 is adapted for attachment to the body of the marker, the ends of the bail extending vertically downward to a secure attachment to the body between each end and the center, as shown in Fig. 2. Consequently the central portion of the bail is above the central portion of the body of the marker, and said marker is provided with a suitable handle 17, said handle being at all times within convenient reach of the driver of the implement.

Upon the vertical lower sections of the bail 16 latches 18 are pivoted, the heads of said latches extending toward the center of the body of the marker. The heads of these latches are normally in a lowered position, but may be raised through the medium of handles 19, connected therewith and guided in suitable bearings formed upon the bail, one handle extending beyond the upper surface of the bail at each side of the handle of the latter, as is likewise best shown in Fig. 2.

The marker is held in operative position and is stayed and strengthened through the medium of a rope or chain 20, preferably the former, the ends of which rope or chain are attached to the forward ends of the marking shoes or blocks 15, and the rope or chain extends in direction of the front of the implement and across the front through eyes or staples 21, attached to the front beam of the implement at or near each side. Between the guide eyes or staples 21 the rope or chain 20 is provided with two knots 22 and 23, located at predetermined intervals apart.

In operation, when it is desired to mark at the left-hand side of the machine—for instance, as shown in Fig. 1—the operator by grasping the handle 17 of the marker-bail can carry the body of the marker over in direction of the left-hand side of the implement until the left-hand knot 22 engages with and is stopped by the left-hand guide or staple 21, and at this time the right-hand latch 18 will be immediately over the tongue 10 and will engage therewith. Thus the left-hand marking block or shoe is carried out the proper distance and the body is inclined so that the shoe or block will engage with the ground, as shown in Fig. 2. If it is desired to mark at the right of the implement, the right-hand latch 18 is raised and the marker carried over in direction of the right until the right-hand knot 23 will be brought in engagement with the right-hand stop, eye, or staple 21. The position of the body of the marker will then be just the reverse of that shown in the drawings.

When the implement is to be turned, whatever latch is in engagement with the tongue 10 or the substituted projection at the back of the implement is elevated and the body of the marker is slid in its bearing until the handle of the bail is carried just back of the driver's seat, whereupon the ends of the body of the marker will be at equal distances from each side of the implement and both marking shoes or blocks will be held out of engagement with the ground, thus permitting the implement to be turned as readily as if no marker were in connection therewith.

Having thus described my invention, I claim as new and desire to secure by Letters Patent—

1. A marker for corn-planters, consisting of a bar rigid throughout its length and provided with marking shoes or points at its extremities, a yoke spanning the central portion of the bar, provided with a hand-grip, the said yoke being attached to the bar at each side of its center, latches pivoted to the members of the yoke, and trip-levers connected with the latches and extending upward adjacent to the grip device of the yoke, the said levers being capable of independent manipulation, as and for the purpose specified.

2. The combination, with a seed-planter provided with an extension at its rear, of a marker comprising a bar passed through the extension of the planter and having guided movement in said extension, the bar being provided with marking-shoes at its extremities, a hand-yoke attached to the bar at opposite sides of its center, latches pivoted upon the hand-yoke and adapted for engagement with the extension of the planter, one latch only being in locking engagement when the marker is in use, trip-levers having guided movement on the yoke and connected with the latch, and a guide rope or chain connected with the ends of the marker and having directed movement upon the body of the planter, as and for the purpose specified.

HERRMAN A. BEHRNS.

Witnesses:
  JOHN H. BEHRNS,
  PETER G. BEHRNS.